Nov. 13, 1951     E. P. ANCONA, JR     2,574,682
PEAK READING MEASURING SYSTEM
Filed Feb. 25, 1949
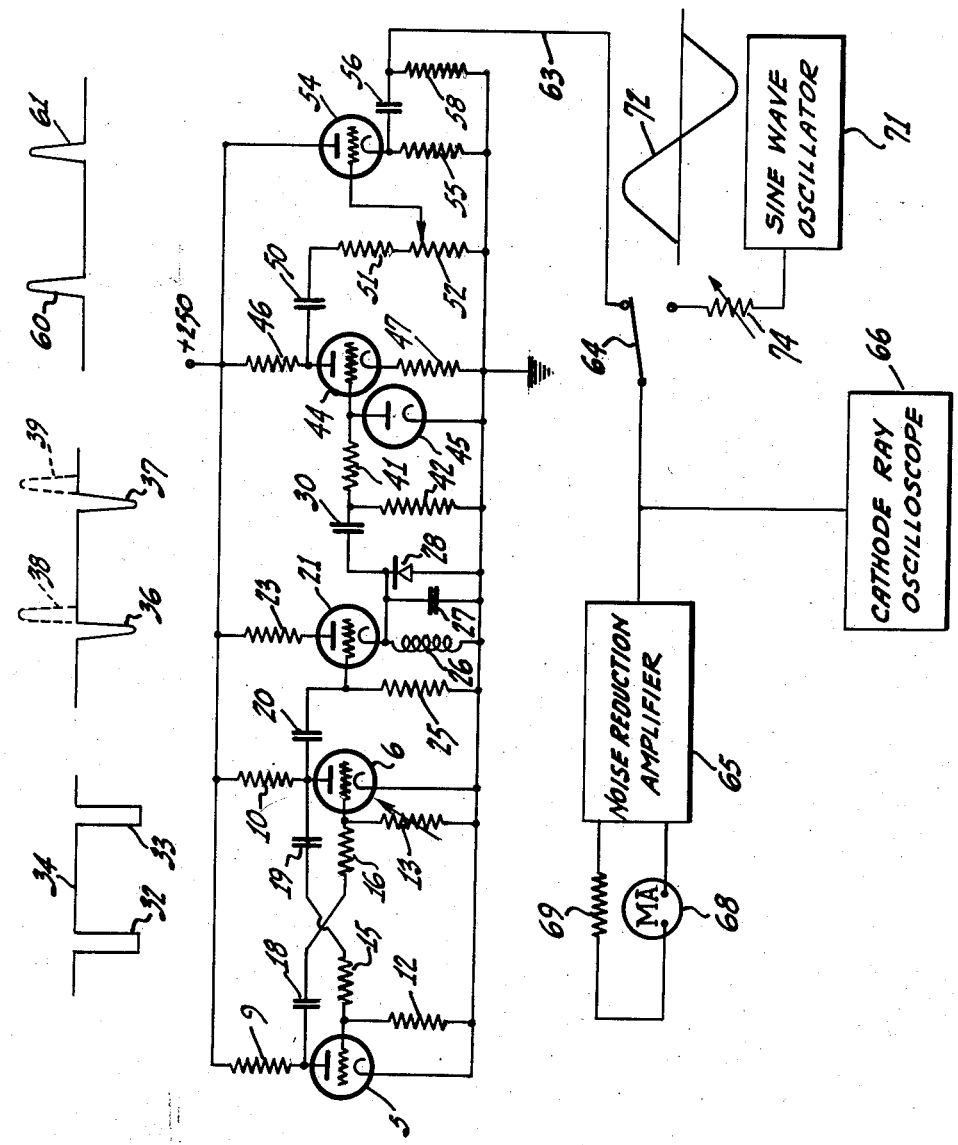
INVENTOR.
EDWARD P. ANCONA, JR.
BY
ATTORNEY Patented Nov. 13, 1951

2,574,682

UNITED STATES PATENT OFFICE 2,574,682

PEAK READING MEASURING SYSTEM

Edward P. Ancona, Jr., Sun Valley, Calif., assignor to Radio Corporation of America, a corporation of Delaware Application February 25, 1949, Serial No. 78,266

5 Claims. (Cl. 179—171)

This invention relates to testing and measuring systems, and particularly to a method of and system for measuring the peak reading ability of a noise reduction amplifier, such as is used in sound recording systems.

It is well-known, in the art of sound recording, particularly when the sound records are photographic, that noise reduction is applied either by making opaque the unmodulated portions of the sound track area of variable area records, or by varying the density of the sound track area of variable density records in accordance with the sound amplitude. Since such noise reduction systems employ a rectifier which may or may not be preceded by an alternating current amplifier and followed by a direct current amplifier, the output of which is impressed on the noise reduction elements, such as either a galvanometer bias winding, a shutter motor, or ribbons of a light valve, it is desirable that the activation of these noise reduction elements follow, as closely as possible, the peak values of the signal. In this manner, the clipping of the peaks of the signal is avoided. However, since a noise reduction amplifier including the rectifier and direct current amplifier, have impedance elements, such as inductances and capacitances, these elements must be adjusted so that maximum response to the peak values is obtained. Since the output current of a noise reduction amplifier is a function of the peak voltage of the signal, for best quality recording, the noise reduction amplifier must have uniform response with respect to frequency, properly proportioned acting time, and an ability to respond to the full peak voltage of non-sinusoidal signals of high peak voltage and low energy content.

The present invention is directed to a method of and system for measuring the peak responsive ability of noise reduction amplifiers by comparing a steep front wave of low energy content with a sine wave of the same peak amplitude. A portion of the pulse generating circuit of the invention is well-known, such as the multi-vibrator, as evidenced by U. S. Patents No. 2,433,863 of January 6, 1948, and No. 2,442,770 of June 8, 1948. The present system, however, employs a cut-off circuit, a wave shaping section, and a cathode follower section with a pulse repetition rate control and a pulse amplitude control. The sine wave oscillator may be of any standard type, a switch being provided for connecting the two sources of input to the noise reduction amplifier at mutually exclusive times. The conditions chosen for the measurement; namely, a narrow pulse, low repetition frequency, and equivalent one hundred percent modulation bias current, provides an indication of the worst peak reading performance to be expected.

The principal object of the invention, therefore, is to facilitate the measurement and test of noise reduction amplifiers.

Another object of the invention is to provide an improved peak reading measuring system for noise reduction amplifiers.

A further object of the invention is to provide an improved system of testing the peak reading performance of a rectifier-direct current amplifier unit.

A still further object of the invention is to provide an improved system for obtaining two signal inputs of the same amplitude, but varying energy content.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which the single figure is a combination schematic and diagrammatic diagram of the system embodying the invention and showing the type of pulses generated by the different units of the system.

Referring now to the drawing, a multi-vibrator unit of any well-known type is composed of vacuum tubes 5 and 6, which may be of the 6SN7 type, load resistors 9 and 10, grid resistors 12 and 13, resistor 13 being variable to adjust the pulse repetition rate, resistors 15 and 16, and coupling condensers 18 and 19. The resistors 9 and 10 may have values of 22,000 and 33,000 ohms, respectively; resistor 12, a value of .15 megohm; resistors 15 and 16, values of 10,000 ohms; and condensers 18 and 19, values of .01 and .00037 microfarad, respectively. The variable resistor 13 may vary between .10 to .70 megohm. The free-running vibrator unit has time constants such that it provides an asymmetrical output wave which is negative for approximately one-fifth of a millisecond, and positive for the remainder of one cycle of the repetition rate. The output of this unit is connected over a .01 microfarad condenser 20 to a keying tube 21, such as a 6SN7 vacuum tube. This tube has a loading resistor 23 of 15,000 ohms, and a grid resistor 25 of 4.7 megohm. In the cathode circuit of tube 21 is a tuned circuit including an inductance 26 and a capacitor 27 shunted by a rectifier 28, which may be of the copper oxide type. The inductance and capacitance values are such to tune this circuit to approximately 5000 cycles.

The action of the portion of the circuit just described is as follows. Referring to the wave form shown above the multi-vibrator, during the time that the positive portion 34 of the output wave is impressed on the grid of tube 21, a steady current will flow through the tube 21 and through the inductance 26 connected to the cathode. When the negative portions 32 and 33 of the multi-vibrator output wave reaches the grid of tube 21, plate current flow in this tube is cut off. Since the current flowing through inductance 26 cannot instantly cease, the inductance discharges into condenser 27, and the resonant circuit consisting of these two elements 26 and 27 commences what would be a train of "damped" oscillations. However, the first positive excursion of voltage in this train of oscillations causes the rectifier 28 to conduct, and thus, to absorb the energy of the resonant circuit and prevent any oscillation after the first one-half cycle. The wave form existing at the cathode of tube 21, therefore, consists of a single, negative, half sine wave 36 and 37 recurring at the frequency of the multi-vibrator oscillation. (See wave form about tube 21.) The dotted portions 38 and 39 of the diagram indicate the first positive wave which does not actually exist, but which is conducted through the rectifier 28.

The series of negative pulses 36 and 37 at the cathode of tube 21 is impressed on the grid circuit of a shaper tube 44 through condenser 30 of .10 microfarad. Resistors 41 of .12 megohm and 42 of .47 megohm constitute the direct current return for the grid of tube 44, and resistor 41 and diode rectifier 45 constitute a clipper circuit of well-known type, which removes any positive excursions remaining in the wave form derived from the circuit of tube 21. Tube 44 has a load resistor 46 of 22,000 ohms, and a cathode resistor 47 of 2,200 ohms. The output of shaper tube 44 is impressed over a .1 microforad condenser 50 and potentiometer resistors 51 and 52 of .27 megohm and 50,000 ohms, respectively, on a cathode follower tube 54, which may be a 6C5 type. The cathode follower has a cathode load resistor 55 of 4,700 ohms and a capacitor 56 of 10 microfarads. A second resistor 58 of approximately 33,000 ohms may be provided to maintain condenser 56 at direct current ground potential.

Since the tube 44 not only shapes the pulse, but also inverts it, the final output of tube 54 is as shown by pulses 60 and 61, which is impressed over conductor 63 and switch 64, when the switch is in its upper position, on a noise reduction amplifier 65 to be tested. Also connected to the input of the noise reduction amplifier 65 is a cathode ray oscilloscope 66, although any type of peak reading volt meter could also be employed at this point. Connected at the output of the noise reduction amplifier 65 is a milliammeter 68 in series with a load resistor 69. For providing a sine wave input to the noise reduction amplifier 65, a sine wave oscillator 71, of any well-known type, is provided, the form of wave generated by the oscillator being as shown by the curve 72. As illustrated, the output of oscillator 71 may be connected by switch 64 to the input of the noise reduction amplifier 65 when the switch 64 is in its lower position.

To operate or measure the peak reading ability of the noise reduction amplifier 65, the pulse repetition rate of the pulse generator 5—6 and the frequency of the sine wave oscillator are first adjusted to the same frequency, such as one hundred cycles per second. The adjustment of the multi-vibrator is accomplished by adjustment of resistor 13 and by throwing switch 64 back and forth, the frequencies of the two sources may be compared on the oscilloscope 66. Now, with switch 64 in its lower position, the output of the sine wave oscillator 71 is then adjusted to a level equivalent to one hundred percent modulation input to the noise reduction amplifier, which is a level determined by the type of noise reduction amplifier being tested. Now, with switch 64 in its upper position, and by means of the gain control 52, the peak voltage of the pulses is adjusted to equal the peak voltage of the sine wave. This may be accomplished by comparing the amplitude of the pulses and sine wave on the oscilloscope 66. Now, with the switch 64 again thrown to its lower position to connect the oscillator 71 to the noise reduction amplifier 65, the gain of the noise reduction amplifier is adjusted to provide a direct current output current equivalent to one hundred percent modulation bias, as read on the meter 68. The particular value of this current is also determined by the type of noise reduction device (shutters versus bias galvanometers) fed by the noise reduction amplifier. The switch 64 is then thrown to its upper position, and, since the noise reduction amplifier is not a perfect peak reading device, the output current will rise, indicating an apparent decrease in the signal level of the input. The noise reduction current existing with pulse input is now noted and the switch 64 is then returned to its lower position. The output level of the oscillator 71 is then reduced by rheostat 74 to produce the same bias current output as was obtained with the pulse input. The reduction, in decibels, necessary to obtain this reading, is then a measure of the peak reading ability of the noise reduction amplifier.

As mentioned above, since the measurement is made with input signals representing extreme conditions which may be encountered during operation, the actual signals in normal operation will lie between these extremes. Thus, the above system provides an accurate and complete determination of the peak reading performance of noise reduction amplifiers.

I claim:

1. A measuring system for a noise reduction amplifier, comprising a source of pulses having a predetermined frequency and amplitude and of low energy content, a second signal source having the same frequency and amplitude but of high energy content, means for connecting said sources to said noise reduction amplifier at mutually exclusive times, means for adjusting the frequency and peak amplitude of said pulses of low energy content to correspond to the frequency and peak amplitude of said second signal, means for adjusting the gain of said noise reduction amplifier to provide an output current equivalent to 100% modulation bias, means for measuring the output current of said noise reduction amplifier at said adjustment with an input of said pulse signal of low energy content, and means for adjusting the level of the input to said noise reduction amplifier from said second signal source to provide an output current equal to that provided by said pulses of low energy content.

2. A measuring system for comparing the outputs of an amplifier-rectifier unit from different sources, comprising a unit for generating electrical current pulses of low energy content, a second unit for generating electrical current sinusoidal waves of comparatively high energy content, means for measuring the amplitude and frequency of said pulses, means for adjusting the pulses from said generating unit of pulses of low energy content to have the same peak amplitude and frequency as the current from the other of said generating units, means for alternatively impressing said waves and said pulses on said amplifier-rectifier unit, means for adjusting the gain of said unit to provide an output current equivalent to 100% modulation bias, means for measuring the output of said unit with an input of said pulses of low energy content, and means for adjusting the level of the input from said sinusoidal waves to provide an ouput current from said unit equal to that provided by said pulses of low energy content.

3. A measuring system in accordance with claim 2, in which said pulse generator unit includes a multi-vibrator, a keying tube, and a pulse shaper and inverting tube, said pulses having steep wave fronts and a predetermined occurrence.

4. A system for determining the peak reading ability of an amplifier-rectifier unit comprising means for generating electrical waves of high energy content, means for generating electrical pulses of low energy content, means for adjusting the frequency and peak amplitude of said waves and pulses to correspond with each other, means for adjusting the gain of said amplifier-rectifier unit for 100% modulation bias when said waves of high energy content are impressed thereon, means for impressing said pulses of low energy content on said amplifier-rectifier unit, means for measuring the output of said unit when said pulses are impressed thereon, means for removing the impression of said waves of high energy content and for impressing said pulses of low energy content on said unit, and means for reducing the level of said high energy content waves to provide the same output from said unit as provided by said low energy content pulses.

5. A system for determining the peak reading performance of a noise reduction amplifier unit comprising means for generating a substantially sinusoidal electrical wave of a predetermined frequency and amplitude, means for generating a series of steep wave front electrical pulses of low energy content, means for adjusting the frequency and peak amplitude of said steep wave front pulses to the same values as said sinusoidal wave, a switch for impressing said sinusoidal wave on said unit, means for adjusting the gain of said unit to provide a direct current output equivalent to 100% modulation, contacts for said switch for removing said sinusoidal wave from said unit and for impressing said pulses on said unit, means for measuring the output of said unit when said pulses are impressed thereon, said switch being actuated to remove said pulses from the input of said unit to impress thereon said sinusoidal wave, and means for reducing the amplitude of said sinusoidal wave as impressed on said unit to obtain the same output from said unit as produced by the impression of said pulses thereon.

EDWARD P. ANCONA, Jr.

REFERENCES CITED

The following references are of record in the file of this patent:

UNITED STATES PATENTS

| Number | Name | Date |
|---|---|---|
| 2,171,216 | Koch | Aug. 29, 1939 |
| 2,394,933 | Mueller et al. | Feb. 12, 1946 |

OTHER REFERENCES

Text, Vacuum Tube Amplifiers, by Valley and Wallman, Radiation Lab. Series, 1948 edition, McGraw-Hill Book Co., pages 301–332.